United States Patent Office 2,783,912
Patented Mar. 5, 1957

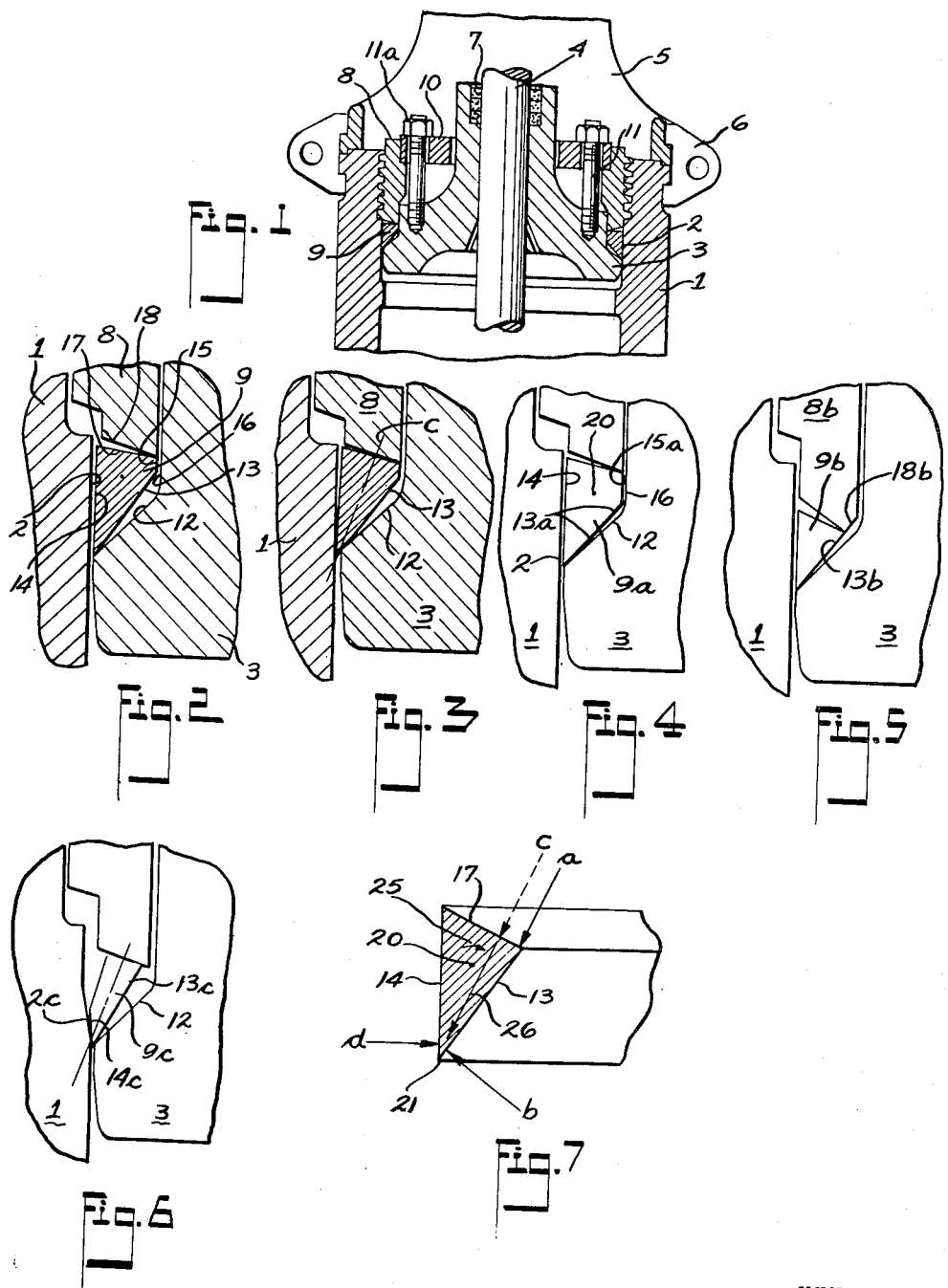

2,783,912

PRESSURE SEALED JOINT

James C. Hobbs, Coral Gables, Fla.

Application May 18, 1955, Serial No. 509,244

5 Claims. (Cl. 220—46)

The present invention relates to fluid-tight joints and particularly to a new joint of the pressure seal type. In my patent, Reissue No. 23,137, is disclosed a pressure seal joint which has been used extensively and successfully for a number of years on high pressure high temperature steam. Joints embodying the present invention resemble the joints of that patent in the general combination of parts but differ therefrom in the shape and arrangement of those parts and in the mode of operation and results.

As is well-known to those skilled in the art, it is difficult to construct a joint which will be fluid-tight under severe and adverse conditions. The nature of the surfaces of such a joint is quite important in terms of the results obtained for a rough surface may cause trouble with leakage past that surface unless sufficient force is secured to embed the gasket in the rough surface with sealing engagement. When such embedding engagement is obtained, it is often difficult to remove the gasket because of its adherence to the rough surface by embedding, galling or seizure.

The initial sealing force in conventional pressure seal joints is secured by the wedging action of a closure member against a gasket with resultant stretching and forcing of the gasket against an opposed wall. The initial sealing force applied to the closure member is in line with the pressure forces and is always greater than the force against the opposed wall because of the necessity of stretching the gasket and also because of the friction between the wedging surfaces of the gasket and closure. When the total initial force is limited, as when the pressure is low or the size of the pressure area is small or when the pretightening means or method is inadequate for the particular roughness of the joint, the sealing may not be sufficient to prevent leakage of the fluid under pressure.

In the great majority of conventional pressure seal joints in use today, the body, closure and gasket are so positioned relative to one another that one surface of the gasket bears fluid tightly upon a conical surface of the closure and the adjacent surface of the gasket bears fluid tightly against the body of the pressure vessel. In such joints the force transmitted by the conical surface of the closure to the engaging surface of the gasket is much greater than the force transmitted by the gasket to the cylindrical surface of the body. It has been found that when leakage does occur in such a pressure seal joint, it first occurs between the gasket and the cylindrical wall of the body. Apparaently this is due to the fact that the loading on the gasket is always less against the cylindrical surface of the body than it is against the frusto-conical surface of the closure.

While it is possible to vary the force transmitted to the cylindrical surface by varying the cone angle of the frusto-conical surface of the closure, such variation will not equalize the forces and, furthermore, there is a practical limit to the cone angle that may be used in attempting to increase the force on the cylindrical surface, that limit being fixed by the angularity at which the parts will lock or seize in position and impede or prevent disassembly of the joint. This invention is the first, so far as I am aware, to embody an arrangement of parts which will permit the application of the necessary sealing forces against the cylindrical wall of the body while avoiding the danger of locking or seizure of the gasket and closure and preventing the overloading of the gasket against the closure.

It is the aim of the present invention to provide a pressure seal joint in which the loading will be approximately the same on the closure and body engaging surfaces of the gasket in which the parts will be easier to install and remove than those now in use and in which the parts will automatically adjust themselves to variations in pressure and temperature.

The gasket of the present invention permits the effective sealing of high pressure fluids with smaller angularity on the closure and does so largely by causing new, limited rotation of the gasket about a center of rotation, this rotational movement being traceable in part to the application of forces to the gasket on coaxial, circular line contacts having different diameters.

Other advantages of the present invention are that the rotational movement of the gasket reduces the force required initially to make line contacts and insure initial sealing, and stores up energy in the gasket which tends to cause counter-rotation when the pressure is removed and thereby tends to release the sealing engagement of the gasket with the body and closure.

Briefly stated, the new mode of operation, and the results, of apparatus embodying the present invention are traceable to the shapes and arrangements of the closure, gasket and retainer which determine the places, directions and amounts of forces applied to the gasket. The preferred gasket is generally triangular in cross-section and has an inner frusto-conical surface engageable initially with the frusto-conical surface of the closure on a circular line of contact. When initial loading is applied by the retainer to the outer end surface of the gasket on a circular line of contact coaxial with, but of less diameter than, the line of contact of the inner frusto-conical surface of the gasket with the closure, the gasket is caused to rotate about its center of rotation until its outer, substantially cylindrical surface engages the opposed surface of the body. Preferably the direction of this force is toward the intersection of the inner frusto-conical surface and the outer, body-engaging surfaces of the gasket. In some instances another inner surface of the gasket may engage a preferably substantially cylindrical surface of the closure and limit the extent of rotation of the gasket. In this manner the forces with which the outer and frusto-conical surfaces of the gasket bear on the opposed surfaces of the body and closure, respectively, are approximately equalized initially and tend to remain approximately equalized as the pressure to be sealed varies.

Other objects and advantages will become more apparent from the following detailed description of illustrations embodying the present invention, in which:

Fig. 1 is a fragmentary, longitudinal, sectional view of a valve having a pressure seal joint embodying the present invention;

Fig. 2 is a fragmentary, enlarged, sectional view of the joint of Fig. 1 with the parts shown in loosely assembled position;

Fig. 3 is a view similar to Fig. 2 but showing the parts in their sealing position;

Figs. 4, 5, and 6 are, respectively, fragmentary, enlarged views similar to Fig. 3 but showing different embodiments of the present invention; and Fig. 7 is a sectional view of a gasket embodying the present invention and showing the approximate location of the center of rotation of the gasket and the places of application of pressure thereto during sealing.

In Fig. 1 is shown a fluid-tight joint constituting part of a valve for high pressure, high temperature fluid. The upper part of the valve body 1 has a valve access opening partly defined by a substantially cylindrical wall surface 2. A bonnet or closure 3 is positioned in said opening and has a central aperture to receive a valve stem 4 which is connected at its lower end to a valve disk or gate (not shown) and, at its upper end, is attached to valve actuating mechanism (not shown) which is carried by the upper part of yoke 5. A ring clamp 6 serves to connect the yoke 5 to valve body 1. Packing 7 surrounds the stem in an enlargement of the stem-receiving aperture of the bonnet and serves to prevent escape of fluid around the stem. A gasket retainer 8 is secured to body 1 against relative axial movement, as by being screw-threaded into the valve access opening. A gasket 9 is positioned between the closure 3 and retainer 7 so as to be engageable with both the wall surface 2 and an opposed surface of the closure 3 to prevent the escape of fluid between the body and closure.

Means are provided for exerting initial sealing force on the gasket. As illustrated in Fig. 1, this means includes a plate 10 which rests on a shoulder on retainer 8, studs 11 which extend through this plate and are screwed into the closure 3 and nuts on these studs and bearing against the outer side of plate 10. By screwing the nuts 11a down on studs 11, the closure 3 may be moved outwardly relative to retainer 8 with the result that forces are applied to the gasket by both the closure and retainer and with the engagement of the gasket with surfaces of the body and closure which will prevent escape of fluid between those two parts. Any other means suitable for the purpose may be substituted for the parts 8, 10 and 11.

In Fig. 2, which shows some of the parts of Fig. 1 on an enlarged scale, the parts are illustrated in the positions they occupy when loosely assembled and before they are brought into initial sealing contact with one another. It will be noted that the frusto-conical surface 12 of closure 3 and the inner frusto-conical surface 13 of gasket 9 contact only near the inner edge of surface 13 and define therebetween an acute angle; that the outer, substantially cylindrical surface 14 of the gasket is spaced apart slightly from the cylindrical wall surface 2; that the inner, substantially cylindrical surface 15 of the gasket at the outer edge of surface 13 is spaced from the opposed, substantially cylindrical surface 16 of closure 3; and that the outer end surface 17 of the gasket engages the inner end surface 18 of the retainer 8 adjacent to the closure 3; and that the surfaces 17 and 18 engage on a circle adjacent to surface 15 and define a small acute angle therebetween.

Fig. 3 is similar to Fig. 2 but shows the several parts in their fluid sealing position after the manner illustrated in Fig. 1. It will be noted that the inner surface 13 of the gasket bears against the opposed surface 12 of the closure, that the outer surface 14 of the gasket bears against the wall surface 2 and that the engagement of the surface 18 of the retainer with surface 17 of the gasket is on a circle having a slightly greater radius than the circle of initial contact indicated in Fig. 2.

It will be noted by reference also to Fig. 7 that the place of initial contact is so positioned that a line drawn normal to surface 17 at this place of contact will pass slightly to the right of the intersection of surfaces 13 and 14. It is also to be noted that the circle of contact of the retainer with the gasket when the parts are in fluid sealing arrangement has moved outwardly or has broadened radially and that a line drawn normal to surface 18 at a point between the sides of the contact area will pass through the gasket to the left of the first normal line and may pass through the intersection of surfaces 13 and 14. The change of position of the parts from that shown in Fig. 2 to that shown in Fig. 3 is caused by moving the closure outwardly relative to the retainer, as may be done by screwing nuts 11a on studs 11 as above described. Such relative movement of the closure and retainer applies forces to the gasket on the two contact circles of different diameters as indicated by arrows a and b of Fig. 7. These forces cause the gasket to rotate slightly about its center of rotation 20 thereby moving the apex 21, which is formed by the intersection of surfaces 13 and 14, away from surface 12 of the closure and toward the wall surface 2. This slight rotational movement is accompanied by outward movement of the closure and with constant or unbroken sealing contacts being maintained between surfaces 12 and 13 and made and maintained near the apex 21 of the gasket between surfaces 2 and 14, as indicated by arrow d on Fig. 7. As the shifting and stretching of the gasket progresses, the circle of contact of retainer 8 with the gasket shifts outwardly from its initial place near the inner periphery of the gasket to a position indicated by arrow c in Fig. 7, that is, enlarges its diameter somewhat, but even when so enlarged its diameter is less than that of the circle of contact of surfaces 12 and 13. Preferably the surfaces 17 and 18 are so positioned initially that when the gasket is in sealing position, a straight line drawn from the apex 21 of the gasket normal to surface 18 will intersect the circle of contact. However, good results may be obtained when a straight line normal to surface 18 at said contact circle does not pass through apex 21 but, instead, extends toward the apex and passes through either of surfaces 13 or 14.

After the parts have been brought into this initial sealing position, fluid pressure applied against the inner end of closure 3 will result only in an increase in the width of the contact area of surfaces 12 and 13 and of surfaces 2 and 14 and, since the gasket can no longer rotate, the area of contact of the retainer with the end surface 17 of the gasket will not be shifted but may be broadened if the pressure is sufficient to deform the gasket.

It will be understood that when the closure 3 has been relieved of the fluid pressure being applied against it in use and the nuts 11a on studs 11 are loosened, thereby relieving the forces applied by the closure and retainer to the gasket, the latter will tend to rotate in the reverse direction about its center of rotation with resultant separation of surface 14 from surface 2 due to its spring-like tendency to return partly to its original shape. Thus disassembly of the joint is facilitated and adherence of the gasket to surface 2 due to galling or other seizure will be greatly minimized or completely avoided.

In Fig. 4, the parts shown are, with certain exceptions, quite like those shown in Fig. 2. One exception lies in the initially close clearance between the substantially cylindrical surface 15a of gasket 9a and the opposed substantially cylindrical surface 16 of closure 3. Another exception is that the inner frusto-conical surface 13a of the gasket initially defines a smaller angle with frusto-conical surface 12 of closure 3.

When initial sealing force is applied to gasket 8a and the surfaces 13a and 14 are brought into initial sealing contact with surfaces 12 and 2 of the closure and body, respectively, and the gasket is rotated about its center of rotation 20, the inner substantially cylindrical surface 15a will bear against surface 16 of the closure, thereby limiting the rotational movement of the gasket.

In the embodiment of the invention shown in Fig. 5, the illustrated parts are generally similar to those shown in the preceding figures but differ therefrom in certain respects. The gasket 9b is an approximately equilateral triangle in cross section and the inner end of retainer 8b is cut away to form a surface 18b which is approximately flush with the inner frusto-conical surface 13b of gasket 9b when the latter is in fluid sealing position.

In the modification shown in Fig. 6, the wall surface 2c of the body 1 departs slightly from the cylindrical shape of surface 2, i. e., it is slightly frusto-conical, the extent of which is exaggerated in Fig. 7. The gasket 9c has a short outer surface 14c which may be slightly frusto-conical so as to be substantially parallel with the opposed surface 2c when in loosely assembled position. The gasket 9c also has an inner surface 13c which forms a much larger included angle with the opposed surface 12 of closure 3 than do the corresponding surfaces of gaskets 9, 9a and 9b.

Fig. 7 shows an enlarged portion of the gasket 9 with its center of gravity and the direction of application of forces indicated thereon. The center of gravity is indicated at 20 and arrows a, b, c and d indicate respectively the direction and places of application of forces to the gasket 9 by retainer 8, closure 3 and body 1, respectively. Arrows a and b indicate, respectively, the direction and place of the initial application of force to the gasket by the retainer 8 and closure 3. It will be understood that when the pressure is initially applied to the gasket on the contact circles, as indicated by arrows a and b, the gasket will be rotated about its center of rotation or gravity 20 in the direction indicated by arrow 25 with resultant shifting of the point of application of force by retainer 8 from the circle indicated by arrow a to the circle indicated by arrow c and coincident application of force by the body 1 at the place indicated by arrow d. Arrow 26 indicates that force applied in a direction normal to surface 17 on the circle indicated by arrow c will pass through or close to apex 21. The force applied by the retainer to the gasket will be opposed by two approximately equal forces applied as indicated by arrows b and d which means that the sealing pressure of the gasket will be approximately the same on the closure and on the body. When the line of force from the retainer does not pass through the apex of the gasket the pressures of the gasket on the closure and on the body will differ.

It is to be understood that the operation of the several illustrated gaskets is substantially as has just been described with reference to Fig. 7 and as was previously described in connection with Figs. 2 and 3, except as has been noted in connection with Figs. 4, 5 and 6.

While the present invention has been described in some detail in connection with a fluid-tight joint for a valve, it is to be understood that it is not limited to such apparatus but may be used on pressure vessels of wide variety.

Having thus described the present invention so that those skilled in the art may be able to understand and practice the same, I state that what I desire to secure by Letters Patent is defined in what is claimed.

I claim:

1. A fluid-tight joint for pressure vessels comprising a body having an opening defined in part by an annular wall surface, a closure in said opening having a frusto-conical surface converging toward the outer end of said opening and opposed to said wall surface, a gasket having an outer end surface, an outer substantially cylindrical side surface and an inner, frusto-conical side surface, said side surfaces intersecting and forming an apex at their inner edges, said inner surface forming an angle with the opposed frusto-conical surface of said closure and being initially engageable on a first, narrow, contact circle near the apex with the said surface of the closure, a gasket retainer having an inner end surface initially engageable with the outer end of said gasket only on a second contact circle concentric with said first contact circle and having a small diameter than that of said first contact circle, and means associated with said body and said closure for applying force to the gasket and causing said outer and inner surfaces of the gasket to engage said wall and closure surfaces with fluid sealing contact.

2. A fluid-tight joint for pressure vessels comprising a body having an opening defined in part by a substantially cylindrical wall surface, a closure in said opening having a frusto-conical surface converging toward the outer end of said opening and opposed to said wall surface, a gasket having an outer end surface, an outer, substantially cylindrical side surface and an inner frusto-conical side surface, said side surfaces intersecting and forming an apex at their inner edges, said inner surface forming an angle with the opposed frusto-conical surface of said closure and being initially engageable on a first, narrow, contact circle near the apex with the said surface of the closure, a gasket retainer having an inner end surface engageable with the outer end of said gasket, when the parts are loosely assembled, only on a second contact circle concentric with the first contact circle and having a smaller diameter than that of said first contact circle and engageable on a radially wider contact area lying entirely within said first contact circle when the gasket is in sealing contact with the body and closure, and means associated with said body and said closure for applying force to the gasket and causing said outer and inner surfaces of the gasket to engage said wall and closure surfaces with fluid sealing contact.

3. A fluid-tight joint for pressure vessels comprising a body having an opening defined in part by a substantially cylindrical wall surface, a closure in said opening having a frusto-conical surface converging toward the outer end of said opening and opposed to said wall surface, a gasket having an end surface, an outer, substantially cylindrical side surface and an inner, frusto-conical side surface, said side surfaces intersecting and forming an apex at their inner edges, said inner surface forming an angle with the opposed frusto-conical surface of said closure and being initially engageable on a first, narrow, contact circle near the apex with the said surface of the closure, a gasket retainer having an inner end surface engageable with the end of said gasket, when the gasket is in sealing contact with said body and closure, only on a contact area having a smaller diameter than that of said first contact circle, lying entirely within said first contact circle, and intersected by a straight line normal to the end of the gasket and extending toward said apex, and means associated with said body and closure for applying force to the gasket and causing said outer and inner surfaces of the gasket to engage said wall and closure surfaces with fluid sealing contact.

4. A fluid-tight joint for pressure vessels comprising a body having an opening defined in part by a substantially cylindrical wall surface, a closure in said opening having a frusto-conical surface converging toward the outer end of said opening and merging into a substantially cylindrical surface, a gasket having an outer end surface, an inner frusto-conical surface, an inner cylindrical surface opposed to the cylindrical surface on the closure, and an outer, substantially cylindrical side surface, said outer side and frusto-conical surfaces of the gasket intersecting and forming an apex at their inner edges, said inner surface forming an angle with the opposed frusto-conical surface of said closure and being initially engageable therewith on a first narrow, contact circle near the apex with the opposed surface of the closure, a gasket retainer having an inner end surface engageable with the outer end of said gasket, when the gasket is in sealing contact with said body and closure, only on a contact area having a smaller diameter than that of said first contact circle, lying entirely within said first contact circle, and intersected by a straight line normal to the end of the gasket and extending toward said apex, and means associated with said body and closure for applying force to the gasket and causing said inner cylindrical side surface of the gasket to engage the cylindrical surface of said closure and force the surfaces forming the apex of the gasket to engage said wall and closure surfaces with approximately equal fluid sealing contact.

5. A fluid-tight joint for pressure vessels comprising a body having an opening defined in part by a substantially cylindrical wall surface, a closure in said opening having a frusto-conical surface converging toward the outer end of said opening, a gasket having an outer end surface, an inner frusto-conical surface, and an outer side surface, said outer side and frusto-conical surfaces of the gasket intersecting and forming an apex angle at their inner edges, said inner surface forming an angle with the opposed frusto-conical surface of said closure and being initially engageable therewith on a first narrow, contact circle near the apex of said apex angle, a gasket retainer having an inner end surface engageable with the outer end surface of said gasket only on a contact area having a smaller diameter than that of said first contact circle and lying entirely within said first contact circle, the outer end surface of the gasket being substantially normal to a line bisecting the apex angle, and means associated with said body and closure for applying forces to the gasket and causing the surfaces forming the apex angle to engage said substantially cylindrical surface and said frusto-conical surface with approximately equal fluid sealing contact.

References Cited in the file of this patent

UNITED STATES PATENTS

| | | |
|---|---|---|
| 2,484,663 | Youngquist | Oct. 11, 1949 |
| 2,665,877 | MacGregor | Jan. 12, 1954 |